R. L. PROUDFOOT.
CAR DOOR HANGER.
APPLICATION FILED OCT. 31, 1911.
1,047,701. Patented Dec. 17, 1912.
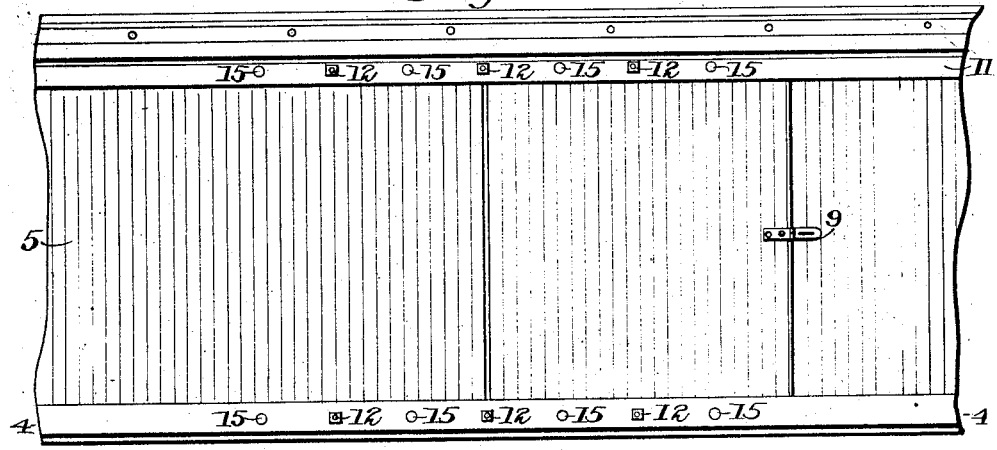
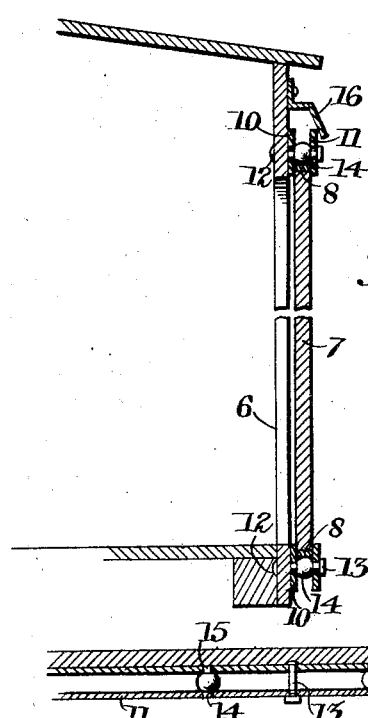
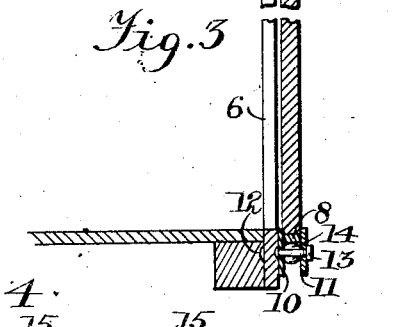
Inventor
Robert L. Proudfoot
By Victor J. Evans
Attorney
Witnesses

# UNITED STATES PATENT OFFICE.

ROBERT L. PROUDFOOT, OF RICHWOOD, WEST VIRGINIA.

CAR-DOOR HANGER.

1,047,701.

Specification of Letters Patent.  Patented Dec. 17, 1912.

Application filed October 31, 1911.  Serial No. 657,887.

*To all whom it may concern:*

Be it known that I, ROBERT L. PROUDFOOT, a citizen of the United States, residing at Richwood, in the county of Nicholas and State of West Virginia, have invented new and useful Improvements in Car-Door Hangers, of which the following is a specification.

The invention relates to car doors, and more particularly to the class of car door tracks.

The primary object of the invention is the provision of a track in which a car door may freely and easily slide for the opening and closing of the same, without requiring physical exertion on the part of an operator, and that will not bind or become caught during movement thereof.

Another object of the invention is the provision of a track which may be easily and readily applied to a car body for supporting and permitting free sliding of the said door.

A further object of the invention is the provision of a track of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a fragmentary side elevation of a car body, showing the door supported in the tracks constructed in accordance with the invention. Fig. 2 is an enlarged fragmentary vertical transverse sectional view thereof. Fig. 3 is a similar view. Fig. 4 is a sectional view on the line 4—4 of Fig. 1.

Similar reference characters indicate corresponding parts throughout the several views of the drawings.

Referring to the drawings by numerals, 5 designates a portion of the side wall of a car body which is constructed in the ordinary well-known manner and is provided with the usual door opening 6 therein, adapted to be closed by means of a sliding door 7, the top, side and bottom edges of which are bound with metallic reinforcing strips 8, so as to strengthen the door and allow for wear, the door being locked by means of a latch 9 of any ordinary type.

The door 7 is supported in upper and lower tracks, each comprising spaced parallel inner and outer metallic bars 10 and 11, respectively, the inner bars being of slightly greater length than the outer bars, and are fastened to the side wall 5 of the car body by means of bolt fasteners, 12, the said inner and outer bars 10 and 11 being connected at intervals by means of transverse stay rods which prevent the contracting or spreading of the bars with relation to each other.

The tracks are disposed above and below the door opening 6 in the side wall 5 of the car, and arranged between the inner and outer bars 10 and 11 thereof, midway between the stay rods 13, are spherical-shaped bearing rollers 14, the same being integral with supporting axles 15 journaled in the inner and outer bars 10 and 11, the bearing rollers 14 being so disposed with relation to each other that at all times the door 7 is in contact with two rollers, both at its top and bottom edges, irrespective of whether the door is in closed, opened, or partially opened position.

Overhanging the upper track and fixed to the side wall 5 of the car body is a ledge strip 16, which latter serves as a shield or protecting cover for the tracks to protect the same from snow, ice, or rain.

The door will freely travel upon the rollers 14, without the possibility of binding thereof, or becoming caught when being swung from closed to opened position, or vice versa.

From the foregoing, taken in connection with the accompanying drawings, it is thought that the construction and operation of the invention will be readily understood, without requiring a more extended explanation.

What is claimed is:

The combination with a car body having a door opening, of identically constructed tracks arranged above and below said door opening, each track comprising inner and outer spaced parallel bars, a plurality of spherical rollers having journal connections with said bars, a door slidably mounted between said parallel bars, and said parallel bars of each track extending above and below said rollers to provide a housing therefor.

In testimony whereof I affix my signature in presence of two witnesses.

ROBERT L. PROUDFOOT.

Witnesses:
W. L. THOMAS,
B. H. SKINNER.